Nov. 19, 1963  E. M. TUCKER, SR  3,111,349
ENDLESS TRACK AND SUPPORTING PONTOON UNIT
Filed July 9, 1962
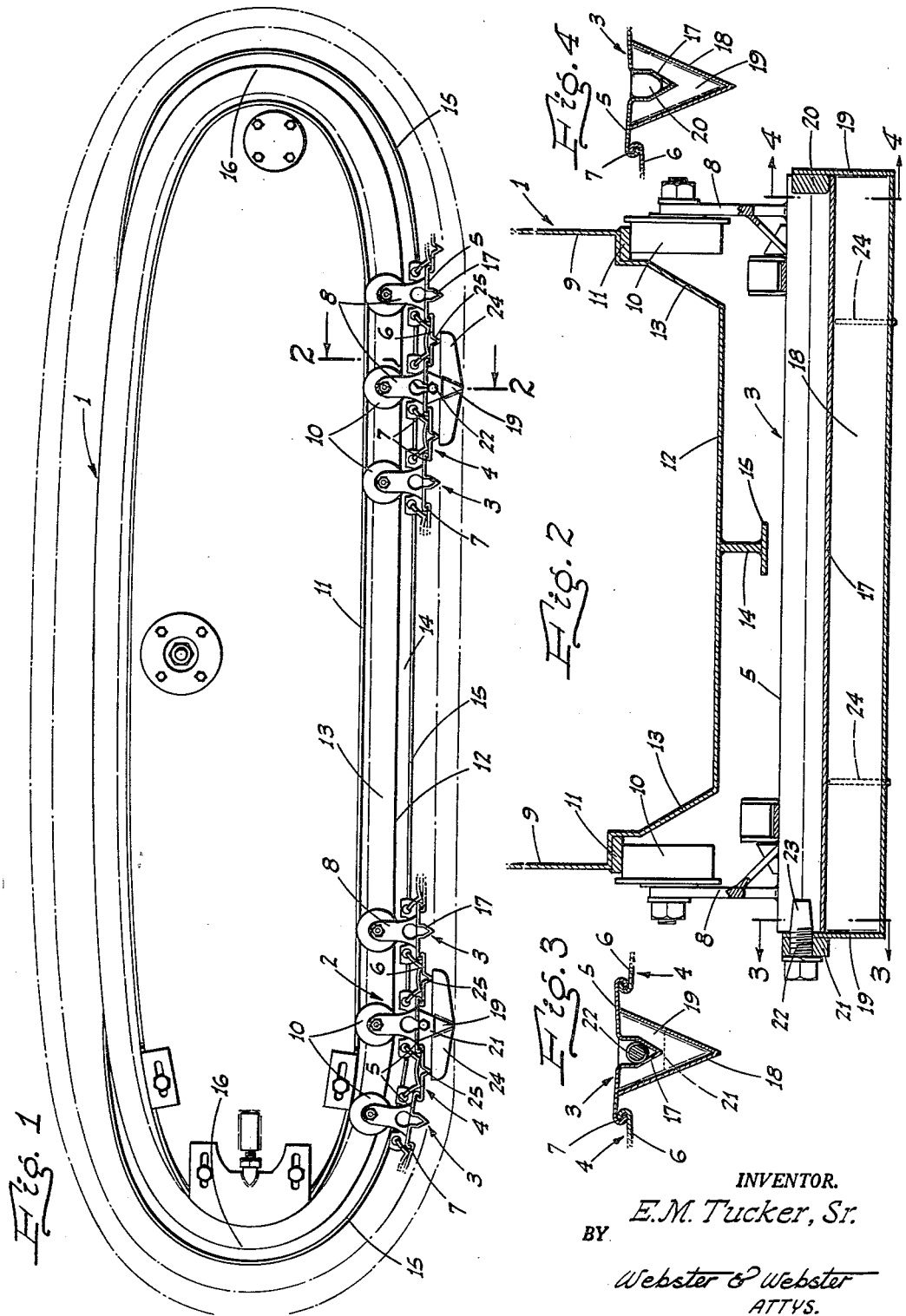
INVENTOR.
E. M. Tucker, Sr.
BY
Webster & Webster
ATTYS.

United States Patent Office 3,111,349
Patented Nov. 19, 1963

3,111,349
ENDLESS TRACK AND SUPPORTING
PONTOON UNIT
Emmitt M. Tucker, Sr., Medford, Oreg., assignor to
Tucker & Sons, Grass Valley, Calif., a corporation of
California
Filed July 9, 1962, Ser. No. 208,494
2 Claims. (Cl. 305—18)

This invention relates to an endless track and its supporting pontoon, and particularly to a unit initially developed for use as the traction providing and supporting structure of a snow traversing vehicle of the type now widely used for the purpose, and known as a SNO-CAT; the structure of the present invention especially representing improvements over that shown in my copending application, Serial No. 136,354, filed September 6, 1961, now Patent No. 3,051,531.

In such a unit, the tread plates of the track units are quite wide, as has been found necessary to prevent the vehicle from possibly sinking into soft or powdery snow over which such vehicle may be traveling. In connection with this feature, it was found to be essential—from a practical standpoint—to make the track links, and the endless track as a whole, as light as possible within practicable limits, and the same are therefore constructed mainly of sheet metal. Since the various links, which include the tread plates, are supported only at their sides from the pontoon, such tread plates tended to flex upwardly intermediate their sides when riding on other than perfectly flat terrain. Because large rocks and the like are apt to be encountered by the tread plates under a deceptively flat covering of snow, said tread plates at times—and when supporting the entire weight of the vehicle—may become permanently bent, and which would interfere with the subsequent full-width tractive effect of the track, besides possibly producing a bind at the flexible connections of the links.

The major object of this invention therefore is to provide a means on the pontoon which will function in conjunction with the tread plates of the links, and acts to prevent such excessive flexing of the tread plates without having permanent frictional and wearing engagement therewith, and which has been found to substantially increase the tractive pressure or effect of the tread plates without any possible damage being done to the track.

In the previous structure, the track-link rollers were confined between channel-shaped rails on the pontoon. Such rails not only tended to become clogged at times with mud and the like, but prevented any downward flexing or sagging of the track, which was found to be desirable in order to allow the track to have full-length contact with uneven terrain.

It is therefore another object of the invention to provide supporting rails on the pontoon for the track which cannot clog and allow the track to sag between its ends to any necessary amount, and a means on the pontoon which will allow the track, which has a certain amount of lateral flexibility, to move upwardly—after thus sagging—to a proper position of lateral alinement of the rollers with the rails.

The various tread plates of the links are provided with cross cleats or grousers of somewhat shallow form, but which are ample for ordinary conditions of operation. At times, however, as in mountainous country, deeper cleats have been found to be desirable, and it is therefore another object of this invention to provide larger and deeper cleats, and a means for quickly and easily attaching and detaching such larger cleats over the ones already provided on the tread plates. Also, said attachment cleats are provided with longitudinally extending wings which aid materially in preventing side-slippage of the vehicle when the latter is operating along a laterally sloping terrain, or what is called "side-hilling."

An additional object of the invention is to provide a practical, reliable, and durable endless track and supporting pontoon unit, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation, partly diagrammatic, of the improved pontoon and endless track unit such as provides the supporting and propelling means for a certain type of vehicle.

FIG. 2 is an enlarged cross section on line 2—2 of FIG. 1.

FIG. 3 is a fragmentary longitudinal section on line 3—3 of FIG. 2.

FIG. 4 is a similar view on line 4—4 of FIG. 2.

Referring now more particularly to the drawings, and to the characters of reference marked thereon, the structure of the present invention comprises an elongated pontoon, indicated generally at 1, and an endless track unit extending about and supported by the pontoon, and indicated generally at 2; the track unit particularly being substantially the same as that shown in the aforementioned copending application, Serial No. 136,354.

Such unit 2 thus comprises a plurality of main track sections or links 3 suitably spaced apart, and a like number of secondary or connecting sections or links 4 arranged in alternating relation to the links 3. Each link 3 comprises a full-width tread plate 5 somewhat wider than the pontoon 1, while the links 4 each comprises a similar tread plate 6; the tread plates of adjacent links being flexibly connected together at adjacent ends in the manner shown in said copending application, and as indicated at 7.

Each link 3 is also provided with brackets 8, which are secured on and project from the related tread plate 5 laterally out from the side walls 9 of the pontoon in a direction toward said pontoon and away from the ground engaging face of the tread plate. Flanged rollers 10 are mounted on the laterally inner faces of the brackets and ride against rails 11 which extend about the pontoon in recessed relation to the side walls thereof in facing relation to the endless track unit.

The peripheral transverse wall 12 of the pontoon 1 is parallel to the rails 11 and is disposed some distance outwardly thereof, or particularly below the lower run of the rails 11. Said wall 12 is narrower than the transverse distance between the rails, while being symmetrically disposed relative thereto, and is connected to the side walls 9 of the pontoon at the laterally inner edges of the rails 11 by sloping skirts 13, which are of course actually parts of the side walls themselves.

Depending from the peripheral wall 12 centrally of the width and particularly along the bottom portion thereof is a heavy rib or what I term a safety rail 14. Said rib or rail includes a relatively wide transverse flange 15, which is normally disposed a short distance above and clear of the tread plates of the track links. This rib or rail extends along the pontoon for the full length thereof at the bottom and around the curved ends 16 of the pontoon as well, feathering off onto the wall 12 at the top of the pontoon, as shown in FIG. 1.

As stated in the preamble of the specification, the vehicles on which the units of the present invention are mounted are particularly designed for use in mountainous country under snow-covered conditions, when rocks and the like are liable to be hidden under the snow and must be traversed. When operating under such conditions, it has been found from experience that the endless track unit should be able to flex up and down as it moves over the sometimes uneven terrain. With the confining channel-shaped rails previously used to confine the rollers, such flexibility could not be obtained, as will be evident. As a result, the lower run of the track sometimes engaged traction-giving elements in its path only at spaced points in the length of such run, and the desired and frequently necessary full-length traction producing action of the track could not be obtained.

It was also found that the roller-confining channel rails tended to become clogged whenever the track was engaged in deep mud or the like, and some of which would spill over and enter the channels.

By reason of the structure hereinbefore recited, the endless tracks are free to flex downwardly, and the free rolling movement of the rollers 10 is never obstructed. Should the track become shifted laterally somewhat by reason of the natural lateral flexibility of the track as the rollers move downwardly and clear of the rails, the track and its rollers are brought back to their properly alined position relative to the rails upon the subsequent upward movement of the track by reason of the contact of the rollers with the sloping skirts 13 of the lower portion of the pontoon 1.

The tread or traction plates of the track links are quite wide, and—being preferably made of sheet metal—thus have a certain inherent flexibility and tend to yield upwardly when resting intermediate their ends on transversely uneven terrain, such as rocks and the like. In such cases, and when the rollers 10 are still engaged by the rails 11, the safety rail 14 comes into play, and—becoming engaged by the upwardly deflected tread plates—prevents such deflection from attaining an excessive and possibly damaging degree. While only one such rail 14 is shown, more may be used if found desirable.

The tread plates 5 of the track links 3 are each formed with a centrally disposed, full-width depending cross cleat 17 which is of hollow and generally V-shaped form in section and open to the related tread plate 5 and at its ends, as shown particularly in FIGS. 2 and 3. These cleats, however, are somewhat shallow in depth, and while of sufficient size under ordinary conditions, have been found to be inadequate for efficient service in very soft terrain.

I have therefore provided additional and relatively large and deep quick-detachable cleats or grousers, which when attached to the endless track increase the traction thereof to a great extent, as is necessary for hill climbing and side hill operations, or in deep mud or the like.

Each such additional cross cleat comprises a V-shaped hollow open topped member or traction cleat 18 the same length as said cross cleat 17 and adapted to straddle the same in clearance relation thereto, and to then abut along its upper edges against the under side of the related tread plate 5, as shown. At its ends the traction cleat 18 is closed by plates 19, which prevent lateral shifting of said cleat on the cross cleat 17.

The traction cleat 18 is held in place on the cross cleat 17 by the following means:

A block 20 is secured on the inner face of one of the end plates 19 at the top; said block being of a size and shape to fit snugly in the adjacent end of the cross cleat 17, as shown in FIG. 4. A heavy plate or similar member 21 is secured on the outer face of the other end plate 19. A tapered-end cap screw 22 is threaded through the plate 21, with its end 23 projecting well into the cross cleat 17, as shown in FIG. 2. The cap screw 22 is of a size such that the end portion 23 thereof will have a snug fit between the sides of the cross cleat 17, as shown in FIG. 3; said end portion being cut on a taper so that as the screw is advanced such end portion will more easily find its way into the cross cleat 17 and will finally wedge itself in a holding position between the sides of said cross cleat 17.

The traction cleat 18 is thus positively prevented from dropping off of the cross cleat 17. At the same time, said traction cleat 18 may be easily withdrawn or detached by first retracting the screw 22 so that the end portion 23 clears the cross cleat 17. This allows the traction cleat 18 to be swung down at the screw end thereof, about the block 20 as a fucrum point, until said end of the traction cleat 18 clears the lower edge of the cross cleat 17. This enables the traction cleat 18 to be slid lengthwise so as to move the block 20 out of the cross cleat 17, which allows the traction cleat 18 to then drop clear of the cross cleat 17. When mounting the traction cleat 18 in place, the reverse procedure is of course followed.

To prevent lateral slipping of the endless track when the vehicle on which the track is mounted is operating on a side hill, longitudinally extending elongated wings 24 are secured on the traction cleat 18 intermediate the ends thereof and in equally projecting relation on both sides of said cleat. The edge of each wing nearest the related cleat plate 5 is parallel thereto but spaced therefrom so as to project below the cross cleats 25 of adjacent track links 4, as indicated in FIG. 1. By reason of this feature, the twisting or rocking movements that may be imparted to the related track link 3 by reason of the enlarged traction cleat 18 are resisted, without preventing the necessary upward flexing of the track links relative to each other as they pass about the pontoon 1.

It should be noted that if the wings are mounted on each traction cleat 18, the wings on alternate cleats must be offset laterally from each other so as not to conflict.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination, a pontoon, an endless track unit extending thereabout and comprising a plurality of links flexibly connected together, each link including a relatively wide resilient tread plate, cooperating elements at the sides of the plates and pontoon mounting the track on the pontoon for relative longitudinal movement, and a safety rail extending along the bottom of the pontoon intermediate the side edges of the tread plates and normally spaced a relatively short distance from the plates of the lower run of the track unit so as to be engaged by said plates after a limited extent of upward flexing of such plates.

2. In an endless track structure which includes a supporting pontoon, rails extending lengthwise about the pontoon at the sides thereof in rigid relation therewith, an endless flexible track unit extending about the pontoon and rails and including rail-engaging rollers, the track unit being slack relative to the rails whereby the rollers of the lower run of the track may move downwardly from the corresponding portion of the rails, said portion of the rails being flat from side to side, and skirts fixed with the pontoon and depending from the laterally inner edges of the lower run of the rails at a laterally inward slope to their lower edges, said skirts terminating at said edges short of the normal level of the links of said lower run of the track unit.

References Cited in the file of this patent

UNITED STATES PATENTS

| | | |
|---|---|---|
| 711,587 | Ober | Oct. 21, 1902 |
| 953,165 | Alexander | Mar. 29, 1910 |
| 1,364,020 | Barletta | Dec. 28, 1920 |
| 1,400,218 | Howe | Dec. 13, 1921 |
| 1,488,629 | Wick | Apr. 1, 1924 |
| 1,948,060 | Bourdon | Feb. 20, 1934 |
| 2,028,346 | Panzegrau | Jan. 21, 1936 |
| 2,308,327 | Darrough | Jan. 12, 1943 |
| 2,483,961 | Ball | Oct. 4, 1949 |
| 2,869,932 | Eichweber | Jan. 20, 1959 |

FOREIGN PATENTS

| | | |
|---|---|---|
| 108,309 | Sweden | Aug. 24, 1943 |